US012660747B2

(12) United States Patent
Barber et al.

(10) Patent No.: US 12,660,747 B2
(45) Date of Patent: Jun. 23, 2026

(54) CONTROL INTERFACE FOR AUTONOMY

(71) Applicant: ASI Landscaping, LLC, Mendon, UT (US)

(72) Inventors: Michael Timothy Barber, Fort Collins, CO (US); Davis Thorp Foster, Boulder, CO (US); Zachary Austin Goins, Boulder, CO (US); Nicole Beth Jacobson, Longmont, CO (US); Matthew Alexander Kaplan, Bellvue, CO (US); Robert Johnstone McCutcheon, IV, Longmont, CO (US); John Gordon Morrison, Longmont, CO (US); Matthew G. Quick, Erie, CO (US); Isaac Heath Roberts, Longmont, CO (US)

(73) Assignee: ASI Landscaping, LLC, Mendon, UT (US)

( * ) Notice: Subject to any disclaimer, the term of this patent is extended or adjusted under 35 U.S.C. 154(b) by 65 days.

(21) Appl. No.: 18/435,532

(22) Filed: Feb. 7, 2024

(65) Prior Publication Data

US 2024/0206381 A1 Jun. 27, 2024

Related U.S. Application Data

(63) Continuation of application No. 16/891,281, filed on Jun. 3, 2020, now abandoned.

(51) Int. Cl.
*A01D 34/00* (2006.01)
*A01D 34/82* (2006.01)
(Continued)

(52) U.S. Cl.
CPC ......... *A01D 34/008* (2013.01); *A01D 34/824* (2013.01); *B60K 31/00* (2013.01);
(Continued)

(58) Field of Classification Search
CPC ................ A01D 34/008; A01D 34/824; A01D 2101/00; B60K 31/00; B62D 51/008;
(Continued)

(56) References Cited

U.S. PATENT DOCUMENTS 8,607,901 B1 12/2013 Depauw
10,037,038 B2 * 7/2018 Sandin ................. G05D 1/0259
(Continued)

FOREIGN PATENT DOCUMENTS

EP 3067771 B1 11/2017

*Primary Examiner* — Hunter B Lonsberry
*Assistant Examiner* — Harrison Heflin

(57) ABSTRACT

A control device for an autonomous lawn mower is described which receives input signals from a first and/or second hand control and determines a control signal for controlling the autonomous lawn mower. The hand controls may provide for intuitive control of the mower by a user. The control signals may be used to operate the autonomous lawn mower to perform a task such that, when later detached or otherwise decoupled, the autonomous lawn mower may perform the same or similar tasks substantially autonomously based on data (e.g., sensor signals, control signals, etc.), generated during manual operation. In some examples, the control signals may be determined to aid a user in maintaining a straight mow, proximity to a desired pattern for mowing, and/or be otherwise altered based on the presence of a user.

17 Claims, 6 Drawing Sheets

(51) Int. Cl.

| | |
|---|---|
| *A01D 101/00* | (2006.01) |
| *B60K 31/00* | (2006.01) |
| *B62D 51/00* | (2006.01) |
| *G01C 21/00* | (2006.01) |
| *G05D 1/00* | (2024.01) |

(52) U.S. Cl.
CPC ......... *B62D 51/008* (2013.01); *G05D 1/0219* (2013.01); *A01D 2101/00* (2013.01); *B60Y 2200/22* (2013.01); *B60Y 2400/306* (2013.01); *B60Y 2400/308* (2013.01); *G01C 21/005* (2013.01); *G05D 1/0246* (2013.01)

(58) Field of Classification Search
CPC .............. G05D 1/0219; G05D 1/0246; B60Y 2200/22; B60Y 2400/306; B60Y 2400/308; G01C 21/005
See application file for complete search history.

(56) References Cited

U.S. PATENT DOCUMENTS

| | | | | |
|---|---|---|---|---|
| 11,178,812 | B1* | 11/2021 | Crowl | A01D 34/64 |
| 11,730,645 | B1* | 8/2023 | Dean | A61G 5/10 |
| | | | | 701/24 |
| 2006/0070774 | A1 | 4/2006 | Hammonds | |
| 2015/0271991 | A1* | 10/2015 | Balutis | G05D 1/0011 |
| | | | | 700/264 |
| 2016/0026182 | A1* | 1/2016 | Boroditsky | B60K 31/00 |
| | | | | 701/23 |
| 2017/0276492 | A1 | 9/2017 | Ramasamy | |
| 2019/0057341 | A1 | 2/2019 | Salter | |
| 2019/0075724 | A1 | 3/2019 | Becke | |
| 2019/0291779 | A1* | 9/2019 | Zeiler | H01Q 1/27 |
| 2019/0389519 | A1 | 12/2019 | Bergsten | |
| 2020/0205338 | A1 | 7/2020 | Zeiler | |
| 2021/0029872 | A1 | 2/2021 | Brandt | |
| 2021/0051848 | A1 | 2/2021 | Bejcek | |
| 2021/0137339 | A1* | 5/2021 | Knuth | A47L 11/4011 |
| 2021/0252698 | A1 | 8/2021 | Paxton | |
| 2021/0261392 | A1* | 8/2021 | Theos | G05D 1/224 |

* cited by examiner

200

210

220

230

500 ⟶

CONTROL INTERFACE FOR AUTONOMY

CROSS-REFERENCE TO RELATED APPLICATIONS

This application is a continuation of co-pending U.S. patent application Ser. No. 16/891,281 entitled "Control Interface For Autonomy" and filed on Jun. 3, 2020, which is herein incorporated in its entirety by reference.

BACKGROUND OF THE INVENTION

Despite advances in artificial intelligence, most autonomous systems and devices rely on previously collected data to operate. For example, sensor data may be collected manually using a first device to be later processed and used by an autonomous second device. Differences between such first and second devices require expensive design changes to accommodate manual control and, worse, may cause unintended operation of the computerized device based on differences between sensors and/or control inputs associated with the first device and those associated with the second. Further, manual control of such devices may be imprecise, causing errors, while autonomous control may limit the ability of an autonomous device to complete a task for complex scenarios the autonomy is not yet capable of handling.

BRIEF DESCRIPTION OF THE DRAWINGS

The detailed description will now be described, by way of examples, with reference to the accompanying drawings, where like numerals denote like elements, a leftmost numeral indicates the original figure in which the element is found, and in which.

DETAILED DESCRIPTION OF THE INVENTION

Figure 1:
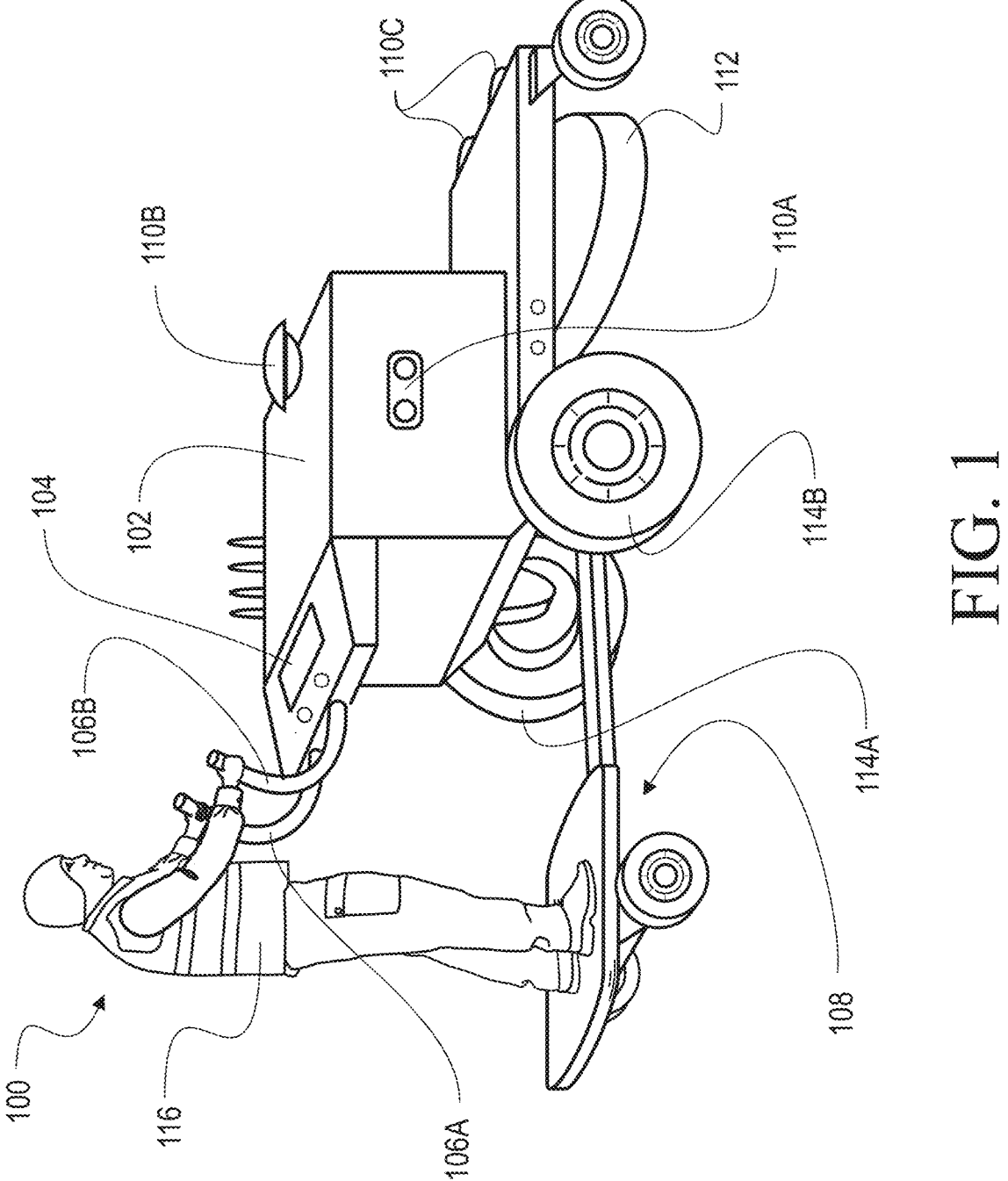
FIG. 1 presents an example system of a user interfacing with an autonomous lawn mower via a control interface.

The following detailed description describes techniques (e.g., methods, processes, and systems) for receiving input from a user to control a device, such as a lawn mower, via a control interface. While connected to the device, a user is able to directly provide control signals to the device while performing a task. Once the task is completed, the control interface may be removed (or otherwise decoupled—wirelessly disconnected, placed into a different mode of operation, etc.). Control signals generated by the user and sensor signals received from sensors associated with the device during operation by the user may be subsequently (and/or contemporaneously) used, for example, to create a map of the area or otherwise provide information to the device to allow the device to perform the same or additional tasks substantially autonomously, and/or aid the user in operation of performing a task. Such manual control of an autonomous device may, for example, ensure that data (e.g., sensor data) received is as close as possible to data that would have been collected from the device if operated completely autonomously, as well as ensure that some very complex tasks which are not possible under autonomous operation alone can be completed, thereby rendering continuous service and/or performance of a task.

As described above, autonomous systems may, in some scenarios, require user input to define boundaries, tasks, etc. As a non-limiting example, a user may control a lawn mower via the control input to define a boundary for future mowing. The boundary may indicate a perimeter of the area to be mowed. In a similar example, the user may mow the entire area (whether or not in a preferred order).

To accomplish the task (e.g., of defining the boundary or performing the mowing), the user may attach (or couple) the control interface to the mower to provide initial controls. In some examples, this may comprise one or more of a mechanical and/or electrical coupling. Of course, the invention is not meant to be so limiting and is only described herein with respect to a control interface for illustration purposes. Indeed, user input from any control device is contemplated, whether connected (mechanically and/or wired), remote (wireless, via a web/mobile interface, or the like), and/or simply placed in a desired setting of autonomous versus manual control.

Once the control interface is connected to the autonomous lawn mower, a user may provide one or more control inputs via the control interface. In an example, the control interface may comprise one or more inputs for receiving controls from a user. Such inputs may be one or more of physical controls (e.g., knobs, dials, buttons, and the like) and/or a touch screen for both displaying information and/or receiving input from the user. In any of the examples described in detail herein, such commands may be relayed to the lawn mower via one or more of a wired or wireless communication interface.

In various examples, a user may provide a desired operating state for the device. The operating state may indicate whether the device is to be controlled autonomously, controlled manually, whether the device is to be parked or disengaged, put in a neutral state, or otherwise. Additionally, or alternatively, a user may input a desired speed for the mower to be propelled, a blade height for the mower, a blade speed (e.g., an RPM) for the mower, data sources for collection (a set of sensors, control inputs, etc.), resetting of odometers, and the like.

If placed in manual operation, a user may use one or more hand controls as input for controlling one or more of a speed or direction of the mower. In some such examples, two hand controls may be provided for each hand of an operator. In at least some examples, an input may be provided on each hand control wherein, as will be described in detail below, combinations of a set speed and hand controls from each of the hand control inputs may be used to control the speed (and/or torque) and direction of the mower.

While under manual control, the mower may record sensor data from one or more sensors onboard the mower. As non-limiting examples, such sensors may comprise cameras (whether RGB, monochrome, infrared, ultraviolet, etc. whether wide field of view, narrow field of view, or the like), lidar, radar, time of flight sensors, radar, ultrasonic transducers, inertial measurement units (IMUs) (which may comprise accelerometers, gyroscopes, and/or magnetometers), wheel encoders, global positioning systems, and the like. Sensor data from the one or more sensors may be recorded as they are generated, at a particular frequency, or otherwise. In additional or alternative examples, control data input from a user may also be recorded with a similar timestamp.

In some examples, a user may control the mower via the control interface for the mower to perform a task. As a non-limiting example, the task may comprise defining a perimeter of a region to be later mowed autonomously by the mower. In such an example, the user may provide input to the control interface to indicate an initialization of the task, may then control the mower via the control interface while performing the task, and finally provide an additional input to indicate that the task has been completed. In at least some examples, the signals indicative of an initialization and/or completion of the task may be generated by a processor associated with one or more of the mower or the control interface based at least in part on connecting or decoupling the control interface from the device.

In various examples, limitations may be placed on the actuation of the mower while the control interface is attached. As a non-limiting example, any one or more of mower speed, blade speed, steering angle (or steering angle rate), may be limited while controlled by a user. In at least some examples, a sensor may detect the presence of a user, such as, but not limited to, cameras, weight/pressure sensors, proximity sensors (such as inductive proximity sensors), etc. on a platform associated with the user to further provide an assurance that the user is currently operating the device and/or provide differing limitations. Limiting control may ensure that the mower is safely controlled while operated by a user.

While operating the device, data from one or more sensors associated with the device, data derived therefrom, and/or control data from a user input may be recorded for later building a map (or other data structure). Such a map may be used by the device in order to operate autonomously over the area associated with the task.

In some examples, the one or more sensors may comprise radar, lidar(s), image sensors (RGB cameras, monochrome cameras, stereo cameras, depth cameras, infrared cameras, ultraviolet cameras, RGB-D cameras, IR cameras, etc.), inertial measurement units (IMUs), accelerometers, gyroscopes, magnetometers, global positioning systems (GPS) or Global Navigation Satellite System (GNSS), ultrasonic transducers (e.g., SONAR), wheel encoders, and the like. In some examples, two or more image sensors may have differing fields of view (e.g., wide and narrow) and have an associated baseline. Environment features, including depth estimates, may be determined based on multi-view geometry techniques of sensor data from the multiple image sensors and/or otherwise provided with depth sensors provided.

Multiple mapping techniques may be used to construct the map based on the acquired sensor data including, but not limited to Simultaneous Localization and Mapping (SLAM), Kalman filters (Unscented Kalman Filters, Extended Kalman Filters, etc.), bundle adjustment, sliding window filters, occupancy grids, and the like. Such a map may be stored as a signed distance function (SDF), truncated SDF (TSDF), triangle mesh, mosaics, or other data structure. Use of voxel hashing may improve memory requirements for both storage and raycasting. In at least some examples, control signals received from the user during mapping may be associated with the map.

In some examples, such maps may be determined on the device. Additionally, or alternatively, sensor data from any of the one or more sensors may be stored on the device for processing on another, more powerful, system (e.g., transmitted wired or wirelessly to a remote device). In such an example, memory, processing power, and weight of the device may be minimized.

As above, once data from the equipment is processed to determine a map, whether onboard the equipment or remote therefrom, the control input portion may be decoupled from the equipment (whether physically removed, wirelessly decoupled, and/or whether a different mode of operation is selected (e.g., a user selecting autonomous mode on the control interface)). Once removed, the equipment may rely on the determined map in order to navigate an area. In at least some examples herein, certain functions may be removed, limited, or otherwise altered based on whether the control input portion is attached or not.

Although described herein with respect to a lawn mower for purposes of illustration, the description is not meant to be so limiting. Any of the techniques, processes, and systems described herein may be used in conjunction with other modes of transport (including, but not limited to attached to aircraft, helicopters, multirotors, watercraft, bicycles, tractors, automobiles, motorcycles, and the like), as well as used alone as a drone, unmanned aircraft vehicle, unmanned watercraft, or the like. Details of such a system are described in detail below with respect to the figures.

The techniques described herein may improve the functioning of a computing system. In such examples, user input controls may be used, either alone or in combination with sensor data associated with user-controlled operation, to provide a basis for autonomous function of a system, ensuring at least a locally optimal solution is obtainable for controlling the system to perform a specified task, while providing an initialization framework for quickly performing such optimization. Further, such techniques may solve the technical problem of errors in autonomous operation of a system based on differences between data captured during such autonomous operation and data collected manually using a manual system for training such a system, thereby minimizing operating differences between the manual and autonomous systems, as well as how to run portions (and/or all) of the autonomous pipeline on the same input as collected during manual control (whether contemporaneously with such input and/or after such input has been collected).

FIG. 1 illustrates an example of a system 100 which may optionally be controlled via a manual input from a user. In the example depicted, the system 100 may comprise an autonomous lawn mower 102 capable of mowing without input from a user. In various examples, such an autonomous lawn mower 102 may identify a region to be mowed, set a desired blade height, and proceed in accordance with a computed pattern to mow the identified region.

As described above, the autonomous lawn mower 102 may require at least a modicum of prior data in order to perform the aforementioned task autonomously and/or be unable to autonomously perform complex tasks. As a non-limiting example, such an autonomous lawn mower 102 may, at the very least, require a perimeter indicative of the region to mow. In order to provide such data, a user 116 may stand aboard a user platform 108 (which, in some examples, may also be detachable) and provide controls via a control interface 104. Though the user platform 108 is depicted in FIG. 1 for illustrative purposes as comprising a separate unit on wheels, the disclosure is not meant to be so limiting. Of course, such a user platform 108 may comprise a platform coupled directly to the autonomous lawn mower 102 (whether affixed or detachable).

As will be described in further detail below, the control interface 104 may have one or more input portions and/or one or more hand input controls 106. In at least some examples, such a system 100 may comprise two hand input controls 106, a right hand input control 106A and a left hand input control 106B, although more or fewer control inputs are contemplated.

In various examples, the inputs to the control interface 104 may comprise signals capable of controlling any one or more components and/or subcomponents of the autonomous lawn mower 102. Such control signals may comprise, for example, a desired speed for the autonomous lawn mower 102, a torque to be applied to either one or more of a left wheel 114A or a right wheel 114B of the autonomous lawn mower 102 (whether directly, or as determined in accordance with the techniques described herein), a braking of one or more of the left or right wheels 114A, 114B, a blade height and/or blade speed for a blade 112 of the mower (shown protected by a blade guard) or the like. In at least some examples, as will be described in detail below, each hand control may be associated with a unique wheel.

While under operation by the user 116, one or more of the control signals input by the user 116 via the control interface 104, sensor data from one or more sensors 110 disposed about the autonomous lawn mower 102, and/or data derived therefrom (detections, segmentations, steering angles, error messages, etc.) may be stored at one or more of memory available at the control interface 104, the autonomous lawn mower 102, and/or a device remote therefrom.

The sensor(s) 110 may comprise one or more of lidar(s), image sensor(s) 110A (which may be RGB, monochromatic, infrared, ultraviolet, etc., as well as form the basis of stereo- or multi-view systems), radar 110C, Global Navigation Satellite System(s) (GNSS) 110B, inertial measurement unit(s) (IMU), accelerometer(s), gyroscope(s), magnetometer(s), wheel encoder(s), ultrasonic transducer(s), thermal imagers, ambient light sensor(s), time of flight sensors, barometer(s), bolometer(s), pyrometer(s), and the like. Such sensor(s) 110 may be disposed about the mowing device 102 in poses (i.e., position and/or orientations) determined to optimize a field of view. Image sensors 110A may comprise narrow field of view cameras and/or wide-angled cameras. Multiple image sensors 110A may be disposed about the mowing device 102 to create various baselines (including dual baselines). As will be described in detail below, sensor data from such sensors may both aid in determination of vegetative health, as well as creation of the vegetative health maps.

Figure 2:
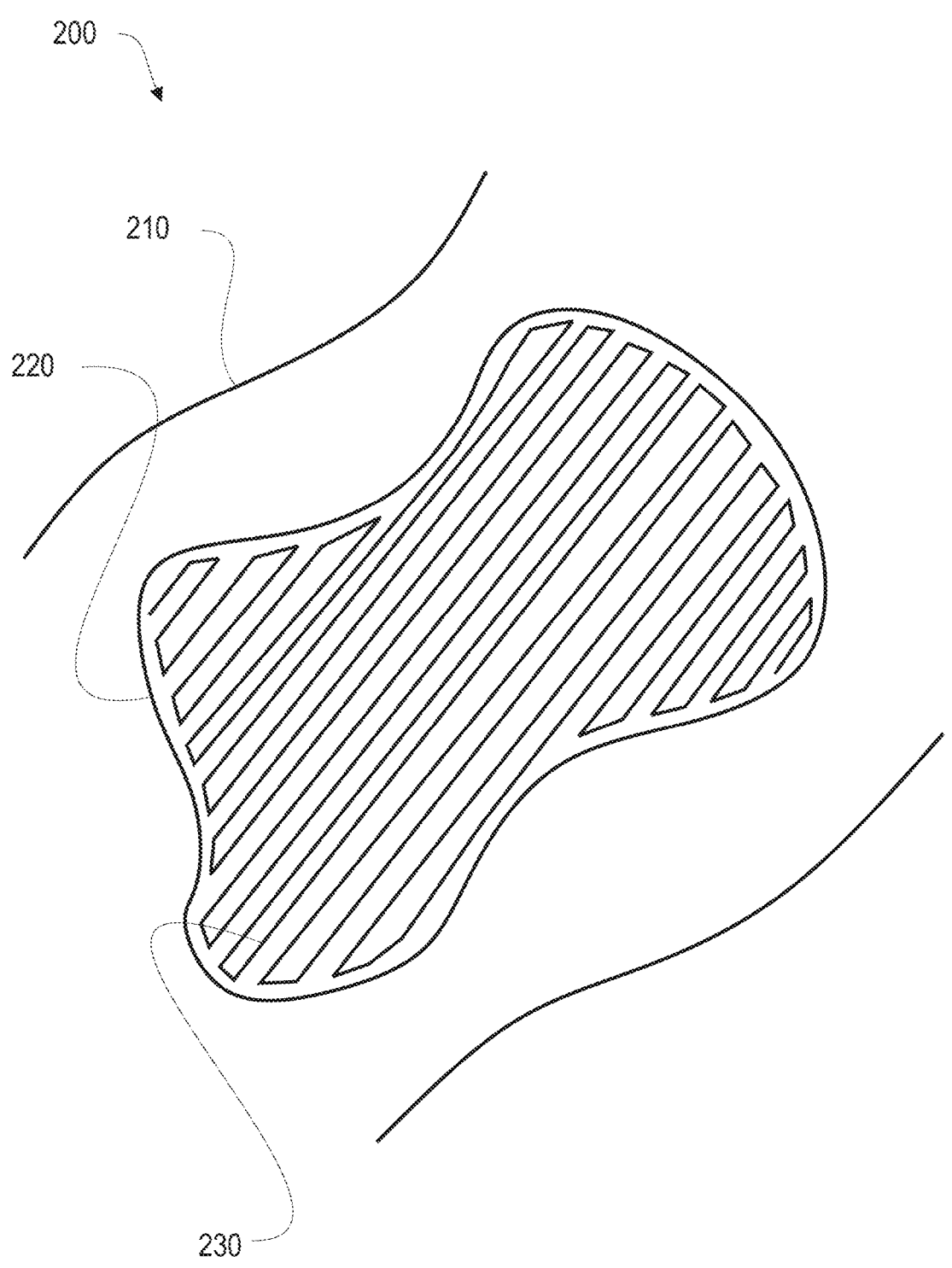
FIG. 2 illustrates an example map that may be created based on sensor data from an autonomous lawn mower, as described herein.

FIG. 2 illustrates an example map 200 that may be created by any system or method as described herein. For illustrative purposes, the map 200 depicts a region in an environment, as well as a portion of the region to be mowed by an autonomous lawn mower, such as autonomous lawn mower 102. The region may be bounded on one or more sides by a boundary 210 (e.g., by a street, sidewalk, source of water, or the like). As an illustrative example, a user may require only a central portion of an environment to be mowed autonomously by the mower. In order to define the region, the user may control the autonomous lawn mower using the control interface to capture the perimeter 220 of the area to be mowed autonomously. As described above, the user may couple the control interface (e.g., physically attach, wired and/or wireless couple, and/or select a manual control on the device), send a signal indicative of initialization, send controls to follow perimeter 220, send a signal indicative of a termination of the task, and finally decouple the control interface (whether physically, digitally (terminating a connection, etc.), or by selecting a different mode of operation). In additional or alternative examples, the user may control the autonomous lawn mower to perform the mowing of the entirety of the region contained within perimeter 220.

As above, the map 200 may be created based on data, such as sensor and/or control data acquired during user control. Such map creation may comprise simultaneous localization and mapping (SLAM), bundle adjustment, Kalman filters, Dense Tracking and Mapping (DTAM), or the like which may be used to fuse data from the one or more sensors to create a data source representative of the area to be mowed. Additional detail of such techniques are provided with respect to FIG. 6 below. Regardless, the map 200 may be stored in the form of a mesh, signed distance function (including a truncated signed distance function), a hash, a lookup, an orthonormal representation of the area, or the like. In various examples, once a map 200 is generated (either by the autonomous lawn mower or a remote computing system), the autonomous lawn mower may use the map in order to perform a further task, such as mowing the region included in the perimeter, e.g., perimeter 220.

In those examples in which only a perimeter, e.g., perimeter 220, is provided, the autonomous lawn mower may explore other areas during an initialization run. During the initialization run, the autonomous mower may assume that there are no obstacles within the perimeter 220 (e.g., sand traps, water—lakes, ponds, etc., trees, bushes, buildings, man-made obstacles, etc.) and attempt to explore (and/or mow) the interior region of the perimeter 220 based on such an assumption. Motion of the autonomous lawn mower during the initialization run may be a pattern determined based at least in part on the perimeter 220. In other examples, the motion may be random or otherwise to ensure that the entire region is covered. During the discovery phase of the initialization run, if an obstacle is encountered (e.g., as may be detected by sensor data), the autonomous mower may attempt to circumnavigate the obstacle before continuing to explore (whether mowing or moving). Once circumnavigation is complete, the mower may then continue to explore by moving (and/or mowing) in the predefined pattern. Sensor and/or control data may be acquired during the initialization run to supplement the map 200 with data over the entire region contained within perimeter 220, as well as to provide any indications of obstacles discovered.

In those examples in which the user performed a mow of the entire region contained by perimeter 220 and those in which control data was stored during an initialization run, the control data may be associated with the map 200. As a non-limiting example, a state of the autonomous lawn mower (position, orientation, velocity, etc.) may be associated with the location on the map corresponding to the position, as well as information associated with torques, steering angles, blade heights, blade speeds, etc. In such an example, the autonomous lawn mower may use the control data associated with the map in order to optimize a pattern for mowing or control signal. As a non-limiting example, such control data may be indicative of, for example, torques applied to the one or more wheels, blade heights, blade speeds, etc. In such examples, control data comprising torques, speeds, mower states, etc., may be used as a reference during an optimization of the lawn mower pattern or controls to one or more of ensure the autonomous mower uses a minimum amount of energy, mows according to a user defined input, provides an initialization value for control input (which may aid, for example, in determining torques when going up/down inclines) or the like. In at least some examples, blade heights, blade speeds, etc., associated with the map 200 may be used when mowing autonomously to ensure a consistency in the cut of grass between being mowed by a user and mowed autonomously. In at least some such examples, independent input from the one or more hand controls may be associated with the map 200 to be used in such optimizations.

In determining controls for performing the mowing, one or more of the autonomous lawn mower and/or the a computing system remote from the autonomous lawn mower may rely on topographical data, weather data, time of year data, and the like in determining a preferred pattern, such as pattern 230, to be followed when performing the mow. In various examples, pattern 230 may comprise a series of waypoints indicative of a desired velocity, position, blade height, blade velocity, wheel torque (for the one or more wheels), etc.

Figure 3:
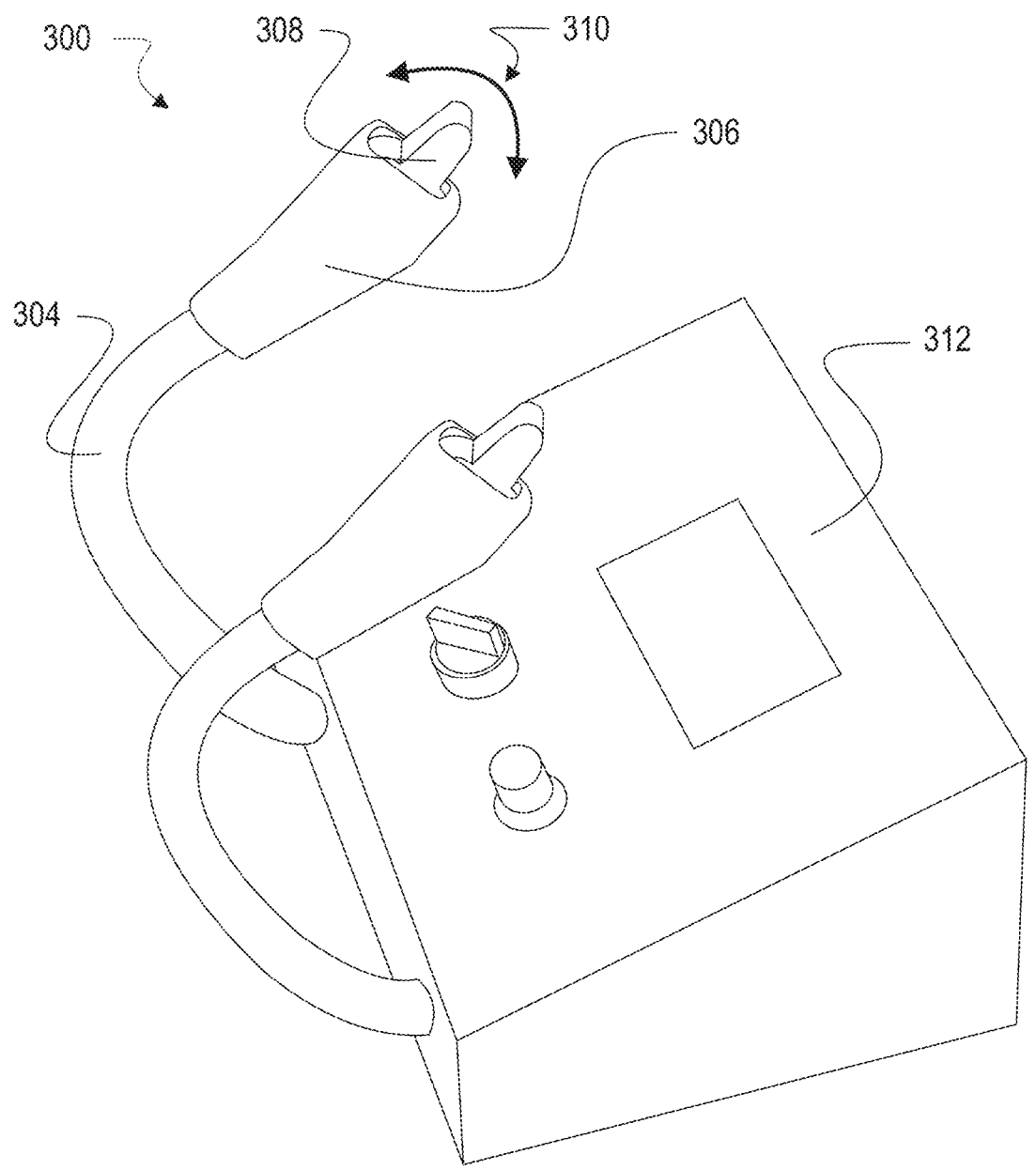
FIG. 3 illustrates hand controls for user input of a control interface, as described herein.

FIG. 3 depicts a detailed view of an example control interface 300 (which may be control interface 104) including one or more hand controls, such as hand control 304. Hand control(s) 304 may be used to provide input for controlling the autonomous lawn mower during operation by a user. Each of the one or more hand control(s) 304 may comprise a grip 306 to facilitate grasping onto the hand control(s) 304 by a user. Such a grip 306 may, in some examples, enable a user to safely hold on and maintain control of an autonomous lawn mower throughout operation, despite any accelerations which may be present. In at least some examples, the grip 306 may comprise a touch sensor (e.g., any one or more of a capacitive, resistive, inductive sensor, switch, button, etc.) to determine whether the user is present.

To facilitate the operation of the autonomous lawn mower, controls may be embedded in one or more of the hand control(s) 304. In the example illustrated, the controls may comprise an analog joystick 308, or otherwise a one-dimensional joystick. In the example provided, the analog joysticks(s) 308 (which may be one-dimensional, two-dimensional, etc., and, in some examples, may comprise an analog rocker, a Hall effect angle sensor, a rotary encoder, a linear encoder, or the like) are embedded in the grip 306 such that a user may easily provide input while holding on to the grip 306. Here, the analog joystick 308 may move forward and backwards along direction 310. In at least some examples, such an analog joystick 308 may, by default, remain in a neutral position halfway between a maximum forward and maximum backward direction. In additional or alternative examples, the grip 306 may have one or more additional input buttons, including, but not limited to, a button which sends a signal when analog joystick 308 is depressed into the drip 306.

Each of the one or more hand control(s) 304 may be affixed to, or otherwise coupled to (whether electrically, mechanically, wired, or wirelessly) a portion of the control interface 312 having one or more additional input and/or output regions.

As will be described in detail below with respect to FIG. 4, signals generated from the one or more controls associated with the hand control(s) 304 (such as signals from the analog joystick 308) may be used to provide a desired torque, velocity, etc., to the one or more wheels associated with the autonomous lawn mower. In some such examples, one or more processors located in the control interface 300 and/or one or more processors in the autonomous lawn mower may limit, or otherwise alter, the controls input by a user via the control interface 300 when coupled to the autonomous lawn mower. In one such example, when a user is detected operating the hand controls (e.g., when the controls are attached (via an electrical coupling, wireless coupling, or otherwise), based on a change of a user platform such as, but not limited to, a proximity sensor (such as an inductive proximity sensor or inductive coupling on the user platform, a pressure sensor on the user platform, etc.), a detection of the user using cameras on board the autonomous lawn mower, etc.), touch sensor associated with the hand controls, etc., input controls may be altered to minimize, for example, a maximum speed, a maximum rotation rate, a maximum torque, a minimum blade height, a maximum blade speed, or the like, as a user may not be able to safely and/or reliably operate the autonomous lawn mower in such regimes. In similar such examples, such limitations may be relaxed when the control interface 300 is decoupled from the autonomous lawn mower.

In further such examples, processors on one or more of the control interface 300 and/or the autonomous lawn mower may alter user provided input to the control interface 300 to ensure, for example, consistent mowing and safe operation of the autonomous lawn mower. As non-limiting examples, control signals may be determined based on user input to cause the autonomous lawn mower to move along straight lines, to perform smooth transitions between blade speeds and/or heights, to ensure consistent and uniform turns, to limit proximity to obstacles, to follow/track an object (such as a curb or fence line—either detected in sensor data, determined from map data associated with a map of the area, or the like), to ensure that the autonomous lawn mower stays within a predefined boundary, and the like. In at least some examples where a pattern, such as pattern 230 illustrated in FIG. 2, is available to the autonomous lawn mower when the control interface is engaged, the one or more processors on the control interface 300 and/or the autonomous lawn mower may ensure positional deviations from the pattern are minimized (e.g., by limiting a control input proportionally to a Euclidian distance to a nearest point along the pattern), while relaxing any one or more other constraints. As a non-limiting example, a user may be able to control the autonomous lawn mower at speeds faster or slower, at blade heights higher or lower, at blade speeds faster or slower, etc., than those associated with the pattern, so long as the autonomous lawn mower proceeds along the pattern. In those examples in which an object is tracked or followed, sensor data from the one or more sensors associated with the autonomous lawn mower may be used to ensure the autonomous lawn mower does not run into the object and/or off the curb, while in the cases of fences and/or curbs, a consistent distance is maintained to the tracked object.

In some examples, the user provided input may be evaluated to determine if the provided controls are sufficient to perform a given maneuver. As a non-limiting example, if a user is attempting to climb a hill with the autonomous lawn mower while in manual control, the resultant torque determined based at least in part on the input from the one or more hand controls may be compared against an amount of torque required to mount the hill (whether determined based on previous controls used by the autonomous lawn mower to mount the hill and associated with map data, based on motor feedback, forward progression, and/or kinematic and/or dynamic models of the autonomous lawn mower, and the like), additional torque may be added to the torque indicated by the user to compensate. In a further such example, torque may be applied to one side (or wheel) to compensate for various orientations of the autonomous lawn mower while advancing up the hill. Of course, any other parameter which controls an aspect of the autonomous lawn mower is contemplated (e.g., blade speed, blade height, etc.).

In at least some examples where a pattern is to be followed, a single hand control may be used which may comprise a one-, two-, or multi-axis/input joystick or input interface. In such examples, a user may control the autonomous lawn mower one-handed by providing an indication of the speed with one axis of the joystick and, in those where more than one axis is used, additional controls with the other axis (blade speed, blade height, orientation, etc.). In similar examples, velocity may be provided by a single hand control, where a direction (forward or reverse) may be provided via the other hand control. In such examples, the autonomous lawn mower may ensure that the user is following a desired mowing pattern, but allow the user to control the speed and direction of such mowing. In at least some such examples, a user may not need to continuously provide input via the one or more hand controls. As a non-limiting example, the autonomous lawn mower may proceed according to a most recent control. As an example, a user may indicate to proceed forward upon which the autonomous lawn mower may follow a pattern until the user provides an additional signal to stop, slow down, reverse, or the like.

Though depicted in FIG. 3 as a control interface 300 to be connected with separate hand control inputs 304, this is for illustration purposes only and the invention is not meant to be so limiting. Of course, in some examples, the control interface 300 may comprise a remote control not connected to the autonomous lawn mower, a web- or mobile-application, and/or have differing interface for hand input controls.

Figure 4:
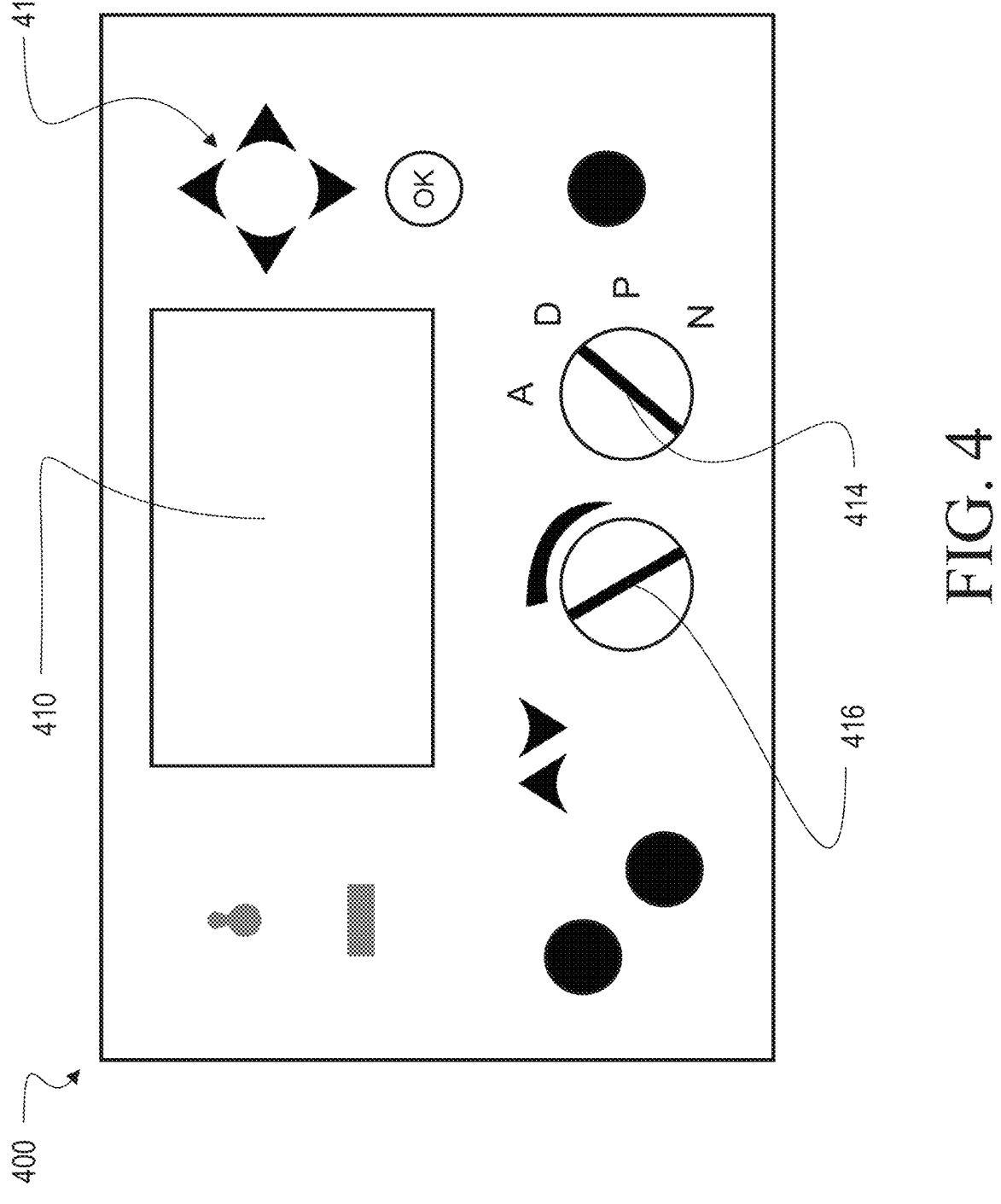
FIG. 4 depicts a user interface of a control interface, as described herein.

FIG. 4 depicts a user interface 400 for a control interface as described in detail herein. Although depicted in FIG. 4 as having a combination of physical inputs (e.g., buttons, knobs, switches, etc.), for illustration purposes, the invention is not meant to be so limiting. Indeed, any one or more of the control inputs described herein may be replaced, removed, or otherwise represented in another input form such as, but not limited to, a touch screen interface, a web-based or mobile application for input, or the like.

As pictured in FIG. 4, the user interface 400 may comprise a screen 410. The screen 410 may display information to a user/operator indicative of information associated with the autonomous lawn mower to which the user interface 400 is connected (whether mechanically, electrically, wired, or wirelessly, etc.). Such information may comprise, for example, state information of the autonomous lawn mower (e.g., position, velocity, acceleration, orientation, blade speed, blade height, etc.), status information associated with the autonomous lawn mower (e.g., battery state of charge, temperature of one or more components/subcomponents, a set or desired velocity, a set or desired blade speed, a set or desired blade height, a set or desired task state (e.g., defining a perimeter, starting mowing, starting task, finishing task, finished mowing, finished perimeter, etc.), etc.), as well as operating state of the autonomous lawn mower (e.g., autonomous mode, manual mode, park, drive, etc.). In at least some examples, the screen 410 may comprise a "touch screen" such that a user may provide input directly via the screen 410 (for any input described herein, as authentication mechanisms, etc.). Where the screen 410 is not a touch screen, the user interface may have one or more buttons, such as cursor control(s) 412 which allow a user to input information to the user interface 400. Additionally, or alternatively, the user interface 400 may comprise a selectable knob 414 such that the user can selectively provide input for a desired state of operation of the autonomous lawn mower (e.g., any one or more of autonomous mode, manual mode, parked, neutral, etc.), such that a user may input a desired state of the autonomous lawn mower and/or a velocity knob 416 such that a user may input a desired speed from a minimum speed to a maximum speed. Of course, any more or fewer inputs or input regions are contemplated, whether through menus, submenus, via web-based/mobile applications (which may be used in conjunction with the user interface 400 and/or as the user interface 400). Of course, though displayed on the user interface 400 for illustrative purposes, the disclosure is not meant to be so limiting. In fact, any of the inputs provided with respect to FIG. 4 may be provided in one or more of the hand controls to facilitate user operation and control of the autonomous lawn mower while operated manually.

In at least some examples, one or more of the screen 410 and/or other feedback devices (speakers, vibrating actuators, etc.), may be used to provide the user with additional information. In a non-limiting example, at least a portion of sensor data from one or more sensors associated with the autonomous lawn mower (e.g., any one or more of cameras, lidars, radars, ultrasonics, and the like) may be used to determine the presence of an obstacle (whether static—trees, shrubs, fallen branches, man-made obstacles, or the like—, or dynamic—animals, pedestrians, etc.), determine the proximity to the obstacle, and perform one or more actions (such as stopping the autonomous lawn mower) and/or alerting the user to the obstacle via one or more of the screen 410 and/or any other output (speakers, vibrating actuators, etc.). Alerting the user may be beneficial as, at least in some instances, the user may not be able to see from the vantage point of standing behind the autonomous lawn mower. In any such examples, obstacle detections determined from the sensor data may be relayed to a central server and made accessible to others to ensure the obstacle is cleared for the current and/or future runs, as well as to inspect the current mowing for safe operation.

In one example, controls received from the one or more hand controls (not pictured) may be proportional to torques provided to the respective wheels. In such examples, when no input is received from a hand control input (e.g., when an analog rocker-style joystick is used and is in the neutral position), no torque may be applied to the corresponding wheel (e.g., when a right hand control rocker is in the neutral position, the corresponding right wheel may have no torque applied to it). Similarly, when such a rocker is moved forward or backwards, torque is applied to the corresponding wheel to cause the wheel to move forwards or backwards, respectively. Such torque may scale linearly or non-linearly with respect to the input hand controls (or user specified wheel velocity). In those examples in which a maximum speed or velocity is set (e.g., via the velocity knob 416), the torque applied may be scaled (whether linearly or non-linearly) relative to the maximum velocity input such that a corresponding linear velocity induced by rotation of either wheel does not exceed the maximum velocity.

In additional or alternative examples, the controls may be augmented by the user input velocity in what may be referred to as a "push-to-steer" control. In such examples, a user may input a desired velocity (or speed) via the velocity input knob 416. The autonomous lawn mower, in such examples, may apply a torque to the one or more wheels to cause the wheels to move forward at the user input velocity. Pushing forward on a rocker-style joystick in such an example causes a reduction in speed of the opposing wheel. As a non-limiting example, pushing forward on a joystick associated with a right hand control input will cause torque and/or velocity of a left wheel to be reduced. In any example herein, such speed/velocity reduction may be a combination of one or more of reversing a direction of current to the motor, reducing an amount of current to the motor, and/or applying a braking force (e.g., by a brake). The reduction of the speed or torque of the opposing wheel may be scaled, whether linearly or non-linearly, such that pushing the rocker-style joystick fully forward may cause the opposing wheel to stop completely. Further, in such an example, pulling the rocker-style joystick backwards may cause a wheel on the same side as the hand control in which the input was provided to rotate backwards. A maximum velocity and/or torque of the wheel may be limited based on the velocity input from the velocity knob 416. As a non-limiting example, pulling the right hand rocker backwards will cause the right wheel to spin backwards. In any such example, the rotation rate, torque, or velocity may be scaled, whether linearly or non-linearly, from zero (or whatever positive velocity is set based on, for example, the velocity knob 416) to the maximum negative velocity.

In any of the examples described herein, one or more transitions may be used in order to smooth changes between a push-to-steer when operating in a forward direction and/or a "additive" operation when operating in a backwards direction. In such examples, the controls may be divided into several regimes and a smoothing function may be applied to ensure that controls vary smoothly from one regime to the other. As a non-limiting example, a sigmoid function may be used to transition the controls from one regime to the other.

While described above with respect to hand controls being associated with one or more torques to apply (or reductions in speed to be applied) to one or more wheels associated with the autonomous lawn mower, additional data may be used to determine such control signals. In any one or more of the examples provided herein, sensor data (including, but not limited to inertial measurement units (IMUs), cameras, lidar, radar, ultrasonics, wheel encoders, global positioning/navigation systems, and the like) may be used to determine a state of the autonomous lawn mower. Such a state may comprise, for example, any one or more of a position, orientation, speed, velocity (whether linear or rotational), acceleration (whether lateral or longitudinal), jerk, and the like. In such examples, the control signals may be determined based at least in part on the current state of the autonomous lawn mower and the one or more input signals from the one or more hand control inputs. In particular in such examples, the control signals may be determined in order to effectuate a body-centric command. That is to say in those examples each hand control does not directly control a wheel of the autonomous lawn mower, but rather a control is determined based on the input and relative to the current motion of the autonomous lawn mower as a whole. As a non-limiting example, the user input(s) may be relative to the current state of the autonomous lawn mower and control signals may be determined accordingly. Here, the hand control inputs are not tied to a particular wheel, per se, but the inputs are associated with motion of one wheel or another based at least in part on the current state of the autonomous lawn mower. In one such example, a linear body velocity may be defined as the average between the detected ground velocity for each of a starboard (right) and port (left) wheel, scaled by the throttle (or selected velocity). A maximum angular body velocity may be defined as the sum of the port and starboard ground velocities scaled inversely by the wheel separation and directly proportional to the throttle and a scale factor (e.g., 0.6, or any number between 0-1). The desired linear body velocity may be determined by multiplying the current linear velocity by one (1) plus the push-to-steer contributions of the left and/or right hand controls (e.g., as may be determined in accordance with the details above). Similarly, the desired angular body velocity may be determined based on the maximum angular velocity scaled by the difference in the push-to-steer angular contributions of the port and starboard wheels. As illustrated in the above example, the control signals may be based on the current state and/or the user inputs and each hand control input may still be associated with a wheel of the autonomous lawn mower to effectuate the input. Of course, such control signals may further be determined in accordance with any other techniques disclosed herein, including, but not limited to causing the device to maintain a straight line, causing the device to follow/track an object, causing the device to follow a predefined pattern, or the like, as well as limited based at least in part on any user preferences, such as those described with respect to FIG. 5 below.

Figure 5:
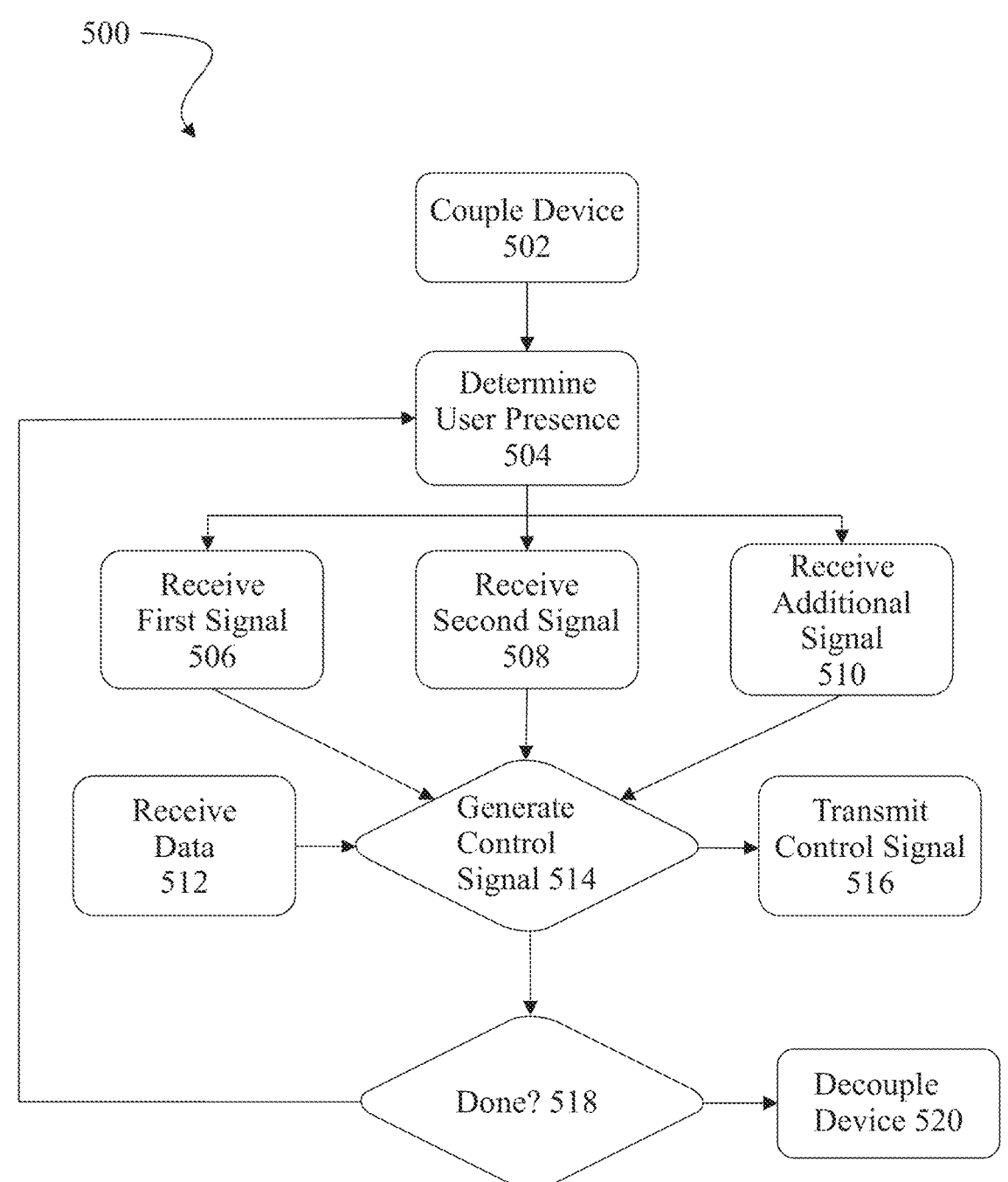
FIG. 5 is an example process diagram illustrating the techniques for receiving user input via a control interface, as described herein.

FIG. 5 illustrates an example flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.), to perform the operations described herein.

FIG. 5 illustrates an example 500 for receiving user input via a control interface and generating a control signal based on the user input in order to control an autonomous lawn mower in accordance with any of the descriptions herein.

At operation 502, a control device may be coupled to an autonomous lawn mower. Such coupling may comprise one or more of a mechanical coupling, an electrical coupling, a selection of a mode of operation, and/or a wireless coupling (whether as a remote control, by a web-based application, mobile application, or similar). In those examples in which a wireless coupling is used, the control device may be a remote control using any one or more communication interfaces as described with respect to FIG. 6 and/or a web application or mobile application.

At operation 504, a user presence may be determined. A user presence signal may be generated, for example, based on an proximity sensor (e.g., inductive proximity sensor or inductive coupling) and/or pressure sensor associated with a user platform associated with the autonomous lawn mower, a touch sensor (e.g., any one or more of an inductive, capacitive, or resistive sensor) associated with the one or more hand controls, and/or receive an RFID or other wireless authentication. In those examples in which a wireless authentication is provided (e.g., where a user swipes an RFID), the autonomous lawn mower may also receive or determine user preferences for operation such as, but not limited to, a desired maximum speed, minimum speed, blade height, blade speed, maximum torque, aggressiveness with which the autonomous lawn mower rounds curves (e.g., lateral accelerations), or the like. In at least some examples, the user presence may also be indicative of a signal received from a user to start a task. In some examples, user presence may be determined based at least in part on input provided by a user such as, but not limited to, pressing a button (e.g., a push to start), performing an ordered combination of actions (button presses or other input), selecting a particular operating mode for the device, and the like. The user presence may also be associated with a specific user, such as a user having an associated unique identifier. Such a user ID may be accessible to the autonomous lawn mower via the RFID, image recognition, or otherwise. In at least some examples, the user may be required to authenticate (e.g., using a password, tapping the RFID code, etc.), before the system will allow additional input.

In either operations 506 or 508, hand controls signals may be provided by either one or more of a first or second hand control associated with the control interface. In at least some examples, the hand control may be based at least on a percentage forward or backward a rocker (or joystick, etc.), is on the one or more hand controls as described in any of FIGS. 3-4 or otherwise herein. Of course, in at least some examples, such hand controls may comprise only one such control such that a user may control the device with a single hand.

Additionally, or alternatively, at 510, a user may interact with additional inputs to create an additional signal. The additional signal (or signals) may be indicative of one or more parameters associated with the autonomous lawn mower. In some examples, such signals may comprise a maximum speed, a minimum speed, a maximum torque, maximum or minimum blade height, maximum or minimum blade speed, and/or any other configurable parameter associated with the autonomous lawn mower. Further, though depicted in FIG. 5 as being in parallel with 506 and 508, such additional signals may be generated before receiving such first and second signals.

At 512, data may be received and be based on (and/or indicative of), for example, a current state (position and/or orientation, velocity, rotational velocity, etc.), of the autonomous lawn mower which, in some examples, may be relative to a desired state. In at least some examples, the data may reflect a difference in the desired state and current measured state of the autonomous lawn mower. The additional data received at 512 may further comprise, in some examples, map data sensor data from one or more sensors associated with the autonomous lawn mower, localization information (which may be determined based at least in part on one or more of the map data and/or the sensor data), pattern data, or the like.

At 514, and as described in detail above, one or more control signals may be generated based at least in part on the first signal, second signal, the additional signal, and/or the data.

At 516 the control signals may be transmitted to a controller (actuator) associated with the autonomous lawn mower to cause the autonomous lawn mower to operate in accordance with the signal.

At 518, it may be determined whether the task (mowing, defining a perimeter, etc.), has been completed. Such a determination may be based on, for example, a signal received from the user indicating completion, by determining that a pattern has been traced, determining that an area has been fully covered (and/or cut to a desired height), and the like. If the task is complete, flow proceeds to 520 wherein the device is decoupled. Otherwise, the flow may return to 504 to ensure that the user is still present. In at least some examples in which a unique user ID is received or determined, additional information may be transmitted to another device (e.g., a remote server) and/or determined with respect to the user after the device is decoupled in 520 and/or the task is completed. As non-limiting examples, a system (whether locally at the autonomous lawn mower via the control interface, at a server remote from the autonomous lawn mower, etc.), may determine statistics regarding the specific user. Such statistics may comprise, for example, an amount of area mowed, a time mowed, an average speed, an average grass height, etc. The statistics may then be made available (e.g., via the internet) to any one or more other users (e.g., company representatives) or applications for further use or processing.

Once the device is decoupled in 520, the autonomous lawn mower may mow the same and/or similar area again without the user input (i.e., the autonomous lawn mower may mow autonomously).

Example System

Figure 6:
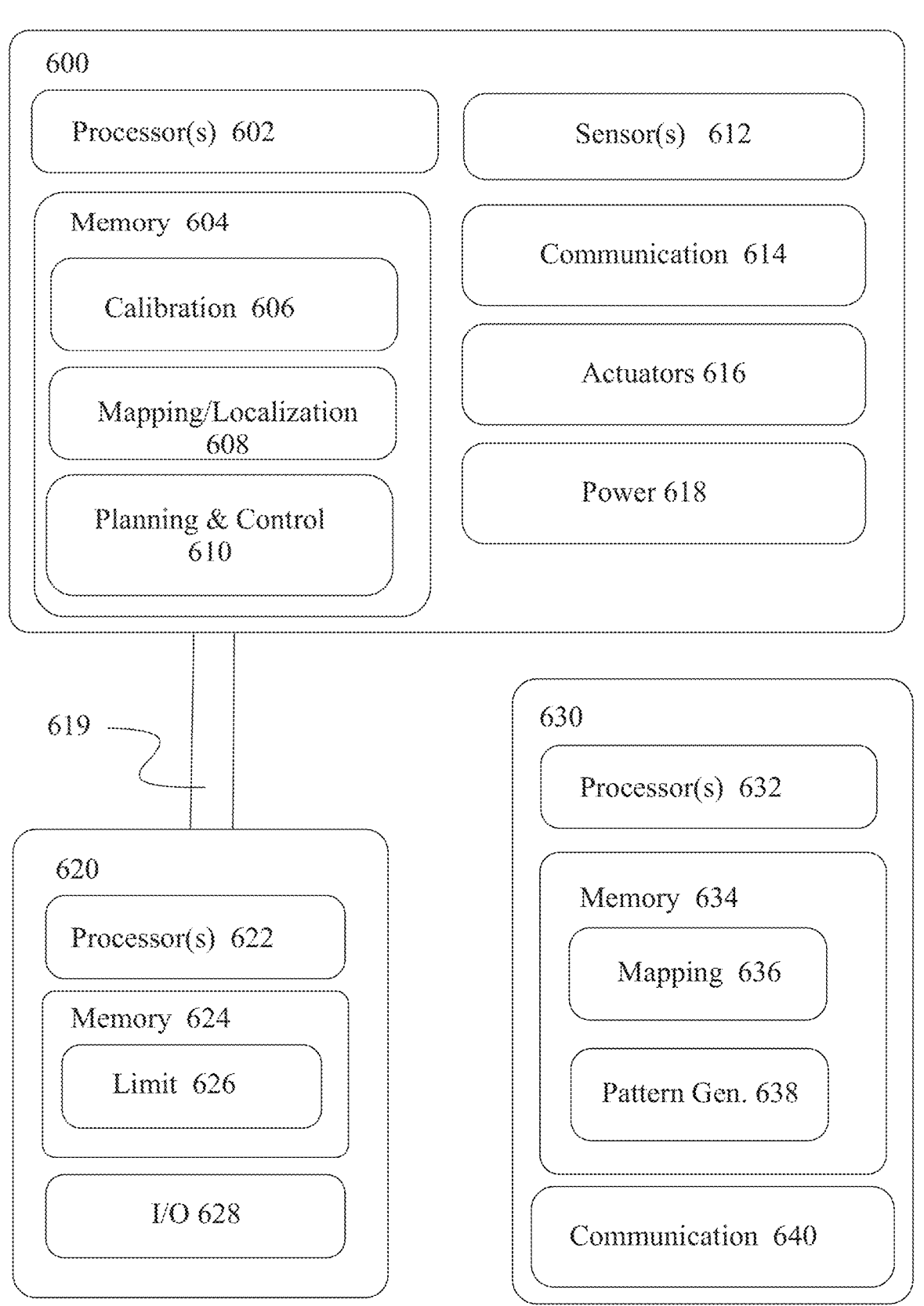
FIG. 6 shows an example system for performing the one or more techniques described herein.

FIG. 6 is an example system 600 capable of performing the operations described herein. Such a system 600 may comprise one or more of processors 602, memory 604, sensor(s) 612, communication subsystem 614, actuators 616, and power system 618. Further, though depicted in FIG. 6 as a single system 600 for illustrative purposes, the intention is not to be so limiting. For example, the system 600 may be a distributed system (either locally or non-locally), where each block may be present on (or performed by) a remote system. Further, though particular blocks are associated with individual systems or subsystems, the disclosure is not meant to be so limiting. Indeed, any block may be present in any one or more of the systems or subsystems illustrated in FIG. 6 (or not present at all).

The system 600 may include one or more processors 602, any of which capable of performing the operations described herein. In some examples, the processor(s) 602 may be located remotely from the system 600. The one or more processor(s) 602 may comprise one or more central processing units (CPUs), one or more graphics processing units (GPUs), digital signal processors (DSPs), field programmable gate arrays (FPGAs), application specific integrated circuits (ASICs), or the like.

Memory 604 is an example of non-transitory computer readable media capable of storing instructions which, when executed by any of the one or more processor(s) 602, cause the one or more processor(s) 602 to perform any one or more of the operations described herein (e.g., those described in reference to any of FIG. 1-6). The memory 604 can store an operating system and one or more software applications, instructions, programs, and/or data to implement the methods described herein and the functions attributed to the various systems. In various implementations, the memory 604 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. Additionally, or alternatively, the memory 604 is capable of storing raw sensor data from the one or more sensor(s) 612, compressed or downsampled sensor data, output (or intermediate representations) of one or more machine learning models (e.g., feature maps of neural networks), and/or representations of the raw sensor data.

Sensor(s) 612 may comprise one or more image sensor(s, radar(s), lidar(s), ultrasonic(s), touch sensors, Global Positioning and/or Navigation Satellite Systems, inertial measurement units (IMUs)—which may comprise one or more accelerometers, gyroscopes, and/or magnetometers, and the like. Image sensors may comprise, for example, RGB cameras, intensity cameras (e.g., greyscale or monochrome), stereo cameras, depth cameras (e.g., structured light sensors, time of flight (TOF) cameras, etc.), RGB-D cameras, infrared cameras, ultraviolet cameras, hyperspectral cameras, and the like. In those examples where multiple image sensors are contemplated, various image sensors may have varying fields of view. For example, where at least two image sensors are used, one image sensor may be a narrow field of view camera and the other a wide angle field of view camera.

Sensor(s) 612 may further include, for example, encoders (such as wheel encoders), ultrasonic transducers (e.g., SONAR), thermal imaging sensors (e.g., infrared imagers), non-contact temperature sensors (e.g., sensors capable of determining the temperature of a surface), ambient light sensors (e.g., light sensors such as, but not limited to, photodiodes capable of determining an intensity of light at 600-1200 nm), humidity sensors, pressure sensors, bolometers, pyrometers, wind speed sensors, and the like. Sensor data from such other sensors 612 may be used to generate the three-dimensional maps and/or localize the device 600. Any of the one or more sensor(s) 612 may also be associated with a timestamp including, but not limited to, a time of day, time of month, and/or time of year (e.g., Jan. 16, 2018 4:50 am UTC). In some examples, a user may specify whether to update an existing map and/or generate a new map.

Such an example system 600 as shown in FIG. 6 may additionally or alternatively comprise one or more communication subsystems 614. An example communication subsystem 614 may be used to send and receive data either over a wired or wireless communication protocol, as well as provide data connectivity between any one or more of the processors 602, memory 604, and sensors 612. Such protocols may include, but are not limited to, WiFi (802.11), Bluetooth, Zigbee, Universal Serial Bus (USB), Ethernet, TCP/IP, serial communication, cellular transmission (e.g., 4G, 5G, CDMA, etc.), and the like. As indicated herein, such a communication subsystem 614 may be used to send data (e.g., sensor data, control signals, etc.), to other systems (e.g., cloud based computers, etc.). In at least some examples, to minimize an amount of data transferred (as raw sensor data may amount to upwards of multiple gigabytes to multiple terabytes per day), raw sensor data from the one or more sensors 612 may be downsampled or compressed before transmission. In at least one example, sensor data (whether raw, compressed, downsampled, a representation thereof, or otherwise) may be automatically uploaded to another computing device when in a particular location (e.g., when in a shed, or other preselected user location). Representations of data may include, for example, averages of the data, feature maps as output from one or more neural networks, extracted features of the data, bounding boxes, segmented data, and the like.

The system 600 may comprise actuator(s) 616, such as, but not limited to, one or more motors to provide torque to one or more wheels associated with the system 600, a linear actuator to raise and lower a blade platform, a motor to spin a blade for cutting, one or more brakes associated with the one or more wheels, and the like. Such actuators may further comprise, for example, electric and/or mechanical motors, hydraulics, pneumatics, and the like. Upon receiving a signal from one or more of the planning and control subsystem 610, at least a portion of the actuator(s) may actuate in order to effectuate a trajectory (steering, acceleration, etc.), release fertilizer, seed, herbicide, pesticide, insecticide, seed, etc., and the like.

System 600 may also comprise a power system 618 including, but not limited to batteries, super capacitors, or otherwise to provide power to the one or more processor(s) 602, actuators 616, sensor(s) 612, or any other component or subcomponent of the system 600 which requires power.

Within memory 604, a calibration component 606 may perform calibration of the one or more sensor(s) 612 and/or actuators 616. Calibration may comprise determining one or more sensor intrinsics and/or extrinsics, as well as determining positions of components or subcomponents (e.g., blade height), applied torques relative to currents applied, and the like. Such calibration protocols performed by calibration component 606 may ensure that any one or more components or subcomponents of system 600 is working properly and enable correct calculations to be generated given the system's 600 current understanding of the relative positions, orientations, and parameters of the other components and subcomponents.

A mapping and localization subsystem 608 may take in sensor data from any one or more of the sensor(s) 612, in addition to any one or more outputs from the calibration subsystem 606 to one or more of map an area and/or provide a position and/or orientation of the system 600 relative to the map. In at least one example, sensor data from the one or more sensor(s) 612 may be used to construct (and/or update) a two- and/or three-dimensional map of the scanned area. When updating, preexisting map data may be received from memory 604 and/or from server 630. Multiple mapping techniques may be used to construct a two- or three-dimensional map based on the acquired sensor data including, but not limited to SLAM, Kalman filters (Unscented Kalman Filters, Extended Kalman Filters, etc.), occupancy grids, bundle adjustment, sliding window filters, and the like. Such a map may be stored as a signed distance function (SDF), or truncated SDF (TSDF), triangle mesh, mosaics, etc. Use of voxel hashing may improve memory requirements for both storage and raycasting. In at least some examples, sensor data may include radar data indicative of subterranean objects (e.g., pipes, golf balls, rocks, etc.). Such subterranean objects may provide features for use in creating the map. For example, locations of sprinklers, piping, rocks, moisture levels, and the like may be combined (or fused) with other sensor data to both generate the maps and localize against them.

Furthermore, various combinations of sensor data may be used to provide additional insight as derived sensor data. As a non-limiting example, sensor data from wide-angle, dual baseline, image sensors may be used to reconstruct depth of the environment and provide additional features for use in generating the map and or localizing the system 600 against such a map. Any such derived sensor data may be either used for mapping and/or localization, as well as may be associated with the map after it has been generated (e.g., storing the value associated with the portion of the map where the data was collected). Further, in at least some examples, control signals (as may be received and/or generated by system 600) may be associated with the map at mapping and localization component 608. In some examples, GNSS data may be used to inform a Region of Interest (ROI) of satellite imagery to download to, or otherwise augment, the two- or three-dimensional map. Additionally, or alternatively, such a system 600 may download, or otherwise access, weather data as additional sensor data. The weather data may be indicative of, for example, weather conditions for the time of day associated with the other sensor data.

Such maps may comprise signed distance functions (SDFs) or truncated signed distance functions TSDFs, mesh representations, UTM grids, mosaics, tiles, etc., including any topological relationship between such sensor data. In some examples, voxel hashing may be used to minimize memory requirements for both map storage and retrieval. Such a map may also be associated with additional sensor data (and/or data derived from the additional sensor data, such as segmentations, classifications, output from machine learning algorithms, etc.). For example, moisture level data, soil density data, vegetative health indicators (growth, absence of growth, presence of pests, presence of weeds or invasive species, etc.), thermal data, ambient light data, etc., may be associated with every location in the three-dimensional map. Additionally, or alternatively, image sensor data (e.g., color) may be associated with the map as well (e.g., by weighted averaging, or the like), so that a user viewing the map would quickly see a virtual representation of the scanned area, including color.

The planning and control subsystem 610 may determine commands for operating one or more of the actuator(s) 616. In some examples, such a planning and control subsystem 610 may determine one or more trajectories for the system 600 to follow (e.g., by determining a series of steering commands, acceleration commands, etc., which cause the system 600 to follow an intended pattern). Such trajectories may be determined in accordance with waypoints (e.g., GNSS-based waypoints) as may be received from a user via control interface 620 and/or calculated to optimize (e.g., minimize) a length of travel over a defined region of interest (e.g., as may be determined by server 630, such as by the pattern generation component 638). Such calculations may be determined, for example, using Bellman Ford's algorithm, Dijkstra's Algorithm, or otherwise. In those examples in which a control interface (control interface 620) is coupled to the system 600, the signals received from the control interface 620 may be directly applied to the actuators 616 and/or used to determine resultant control signals to apply to the actuators 616 in accordance with the techniques set forth herein (e.g., to cause a user to follow a pattern, mow in a straight line, etc.), as described in further detail in FIGS. 1-5.

In those examples in which the system 600 is operated manually (e.g., by being pulled, pushed, attached to a mower, etc.), the planning and control subsystem 610 may nonetheless calculate an optimal control pattern for a user to take. As a non-limiting example, such a trajectory may comprise the shortest pattern needed to sweep an area (region) provided and/or otherwise determine control signals for actuation based on input received from a user in order to perform a particular task.

In any such example provided herein, such trajectories and/or controls may be calculated iteratively (and/or periodically) such that the system 600 (and/or associated user (s)) always has the most relevant information.

Control Interface

The system 600 may receive input from a user via a control interface 620. The control interface 620 may comprise one or more processor(s) 622 and/or memory 624, which may be similar to processor(s) 602 and memory 604. In additional or alternate, examples, the control interface 620 may comprise various input and/or output interface(s) I/O 628. I/O 628 may comprise one or more hand controls and/or additional inputs, as described in detail in any of FIGS. 1-4, as well as input to receive an RFID, authentication, touch sensors, or otherwise. Memory 624 may comprise limit controls 626. Such limit controls 626 may limit the inputs provided via the I/O 628 (either based on whether a user is detected at the system 600 and/or to determine one or more control signals based on the input received from the I/O 628 as described herein. The control interface 620 may be coupled to system 600 via interface 619. As described in detail above, such an interface 619 may comprise one or more of a mechanical coupling (latches, hooks, living hinges, tension fittings, fasteners, and the like), electrical couplings (e.g., to provide one or more of power to and/or communications between the system 600 and the control interface 620), and or a wireless coupling. In those examples in which a wireless coupling is used, such a wireless coupling may use a similar communication protocol as described with respect to communication component 614 and/or communicate via the internet when a mobile and/or web application (e.g., as relayed by a server 630) to system 600.

Server

Server 630 may comprise one or more processor(s) 632, memory 634, and/or a communication component 640. The processor(s) 632 and memory 634 may be the same or similar to processor(s) 602 and memory 604. Similarly, communication component 640 may be similar to communication component 614. Though not illustrated for clarity, server 630 may communicate with either of the system 600 and/or control interface 620 via the communication component 640. Further, though depicted as a single entity, the server 630 may comprise a distributed system, whether locally or remote from one another.

Memory 634 may comprise a mapping component 636. Such a mapping component 636 may receive sensor data (and/or data derived therefrom) from the one or more sensor(s) 612 (e.g., via communication component 640) and use such sensor data to generate a map of an area. Mapping component 636 may be similar to, or the same as, mapping/localization component 608.

Memory 634 may further comprise a pattern generation component 638. Such a component may determine an optimal path and/or waypoints for the system 600 to follow to perform a given task such as, but not limited to, a path to follow when mowing an indicated area.

Though not illustrated for clarity, server 630 may further receive any other form of data (e.g., user authentication, obstacle detections, and the like) and further process the data and make it available to any other user. As several non-limiting examples, server 630 may compute statistics about a user operating the system 600 (such as amount of time mowed, an area mowed, and the like) and make that available to an end user (e.g., via a web interface). Similarly, additional data about obstacles received from the system 600 and/or control interface 620 may be sent to an additional user to ensure that the obstacle is cleared for later autonomous mowing by the system 600.

Of course, though described above as three distinct systems (system 600, control interface 620, and server 630), any one or more of the components or subcomponents may be located in any one or more of the other systems or subsystems and any process or operation described herein may be performed on any one or more system or subsystem (including in in a distributed fashion).

EXAMPLE CLAUSES

A. A control device for interfacing with an autonomous lawn mower, the control device comprising: a first hand control configured to generate a first signal; a second hand control configured to generate a second signal; one or more additional input regions to generate an additional input signal; one or more processors; and one or more non-transitory computer readable media storing instructions thereon which, when executed by the one or more processors, cause the one or more processors to perform the operations comprising: receiving sensor data from one or more sensors associated with the autonomous lawn mower; determining, based at least in part on the sensor data and one or more of the first signal, the second signal, or the additional signal, a control signal; and controlling the autonomous lawn mower based at least in part on the control signal.

B. The control device as described in example clause A, wherein the sensor comprises one or more of an inertial measurement unit (IMU), and wherein determining the control signal comprises: determining, based at least in part on the sensor data, a current state of the autonomous lawn mower, the current state comprising one or more of a position, an orientation, a linear velocity, or an angular velocity; determining, based at least in part on one or more of the first signal, the second signal, or the additional signal, a desired state of the autonomous lawn mower; and determining, based at least in part on a difference between the current state and the desired state, the control signal, wherein the control signal comprises an amount of torque to be applied to a wheel associated with the autonomous lawn mower.

C. The control device as described in either of example clauses A or B, wherein the control device is coupled to the autonomous lawn mower via one or more of: a mechanical coupling, an electrical coupling, or a wireless coupling.

D. The control device as described in any of example clauses A-C, wherein the first signal received from the first hand control of the control interface is associated with a wheel speed of a first wheel of the autonomous lawn mower and the second signal received from the second hand control interface is associated with a wheel speed of a second wheel of the autonomous lawn mower, and wherein the additional input is indicative of a maximum speed of the autonomous lawn mower.

E. The control device as described in any of example clauses A-D, wherein determining the control signal comprises: receiving a current position of the autonomous lawn mower; determining a distance between the current position and a closest point along a pattern to be mowed by the autonomous lawn mower while operated by the user; and determining, based at least in part on the distance, the first signal, and the second signal, a torque to apply to a wheel associated with the autonomous lawn mower.

F. The control device as described in example clauses A-E, wherein the operations further comprise determining a user presence signal based at least in part on one or more of: the additional signal, a signal received from an RFID tag, an inductive proximity sensor associated with a platform on which the user is standing, a pressure sensor associated with the platform, a capacitive sensor associated with one or more of the first or second hand controls, an inductive sensor associated with one or more of the first or second hand controls, a resistive sensor associated with one or more of the first or second hand controls, or camera data from one or more cameras associated with the autonomous lawn mower, and wherein determining the control signal is further based at least in part on the user presence signal.

G. A method for controlling an autonomous lawn mower comprising: receiving, from a control device, a signal associated with a hand control of the control device; receiving, from the control device, an additional input;

receiving sensor data from a sensor associated with the autonomous lawn mower; determining, based at least in part on the sensor data, a current state of the autonomous lawn mower, the current state indicative of one or more of a position, an orientation, or a velocity of the autonomous lawn mower; determining, based at least in part on the current state of the autonomous lawn mower and one or more of the signal or the additional signal, a control signal; and controlling the autonomous lawn mower based at least in part on the control signal.

H. The method as described in example clause G, wherein the control device is coupled to the autonomous lawn mower via one or more of: a mechanical coupling, an electrical coupling, or a wireless coupling.

I. The method as described in any one of example clauses G or H, the method further comprising determining whether a user is associated with the control device based at least in part on one or more of: an inductive proximity sensor associated with a platform on which the user is standing, camera data from a camera associated with the autonomous lawn mower, a pressure sensor, an RFID tag, or the additional input, and wherein determining the control signal is further based at least in part on determining whether a user is associated with the control device.

J. The method as described in any one of example clauses G-I, wherein the control signal comprises one or more of: an amount of torque to apply to a wheel of the autonomous lawn mower on a same side associated with the hand control, an amount of a reduction in speed to apply to an opposing wheel of the autonomous vehicle on an opposite side associated with the hand control, or an output of a piecewise smooth function comprising at least a sigmoid function.

K. The method as described in any one of example clauses G-J, wherein the current state of the autonomous lawn mower comprises a position, and wherein determining the control signal comprises: receiving a pattern along which the autonomous lawn mower is to mow; determining a distance between the position and a closest point on the pattern; and determining, as the control signal and based at least in part on the distance, a torque to apply to a wheel associated with the autonomous lawn mower.

L. The method as described in any one of example clauses G-K, further comprising receiving map data associated with an environment through which the autonomous lawn mower is traversing, wherein determining the control signal is further based at least in part on the map data.

M. The method as described in any one of example clauses G-L, wherein the signal is generated at a first time, and wherein the sensor data is received at a second time after the first time, the method further comprising determining, at a third time after the second time, the autonomous lawn mower to be operated in an autonomous mode, wherein, after the third time, the autonomous lawn mower is configured to mow exclusive of additional signals generated by the control device.

N. One or more non-transitory computer readable media having instructions stored thereon which, when executed by one or more processors, cause the one or more processors to perform the operations comprising: receiving, from a control device, a signal associated with a hand control of the control device; receiving, from the control device, an additional input; receiving sensor data associated with a sensor of an autonomous lawn mower coupled to the control device; determining, based at least in part on the sensor data and one or more of the signal or the additional input, a control signal, wherein the control signal is configured to control an autonomous lawn mower.

O. The one or more non-transitory computer readable media described in example clause N, wherein the hand control comprises a joystick and the signal is determined based at least in part on an orientation of the joystick relative to a neutral position of the joystick.

P. The one or more non-transitory computer readable media described in either example clause N or O, wherein the operations further comprise determining, based at least in part on the sensor data, whether a user is associated with the control device, and wherein determining the control signal is further based at least in part on determining whether the user is associated with the control device.

Q. The one or more non-transitory computer readable media as described in any of example clauses N-P, wherein determining the control signal comprises: determining, based at least in part on the sensor data, a current state of the autonomous lawn mower, the current state comprising one or more of a position, an orientation, or a velocity of the autonomous lawn mower; determining, based at least in part on one or more of the signal or the additional input, a desired state of the autonomous lawn mower; determining a difference between the current state and the desired state; and determining, as the control signal and based at least in part on the difference, an amount of torque to apply to a wheel of the autonomous lawn mower.

R. The one or more non-transitory computer readable media as described in any of example clauses N-Q, wherein determining the control signal comprises: determining, based at least in part on the sensor data, a current position of the autonomous lawn mower; receiving a pattern along which the autonomous lawn mower is to mow; determining a distance between the current position and a closest point on the pattern; and determining, as the control signal and based at least in part on the distance, a torque to apply to a wheel associated with the autonomous lawn mower.

S. The one or more non-transitory computer readable media as described in any of example clauses N-R, wherein the operations further comprise receiving map data, and wherein the control signal is further based at least in part on the map data.

T. The one or more non-transitory computer readable media as described in any of example clauses N-S wherein the signal is received at a first time, wherein the sensor data is received at a second time after the first time, and wherein, after the second time, the autonomous lawn mower is configured to mow a pattern based at least in part on additional sensor data from the one or more sensors and exclusive of additional signals generated by the control device.

CONCLUSION

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AB, ABC, ABB, etc.). When "and/or" is used, it should be understood that the elements may be joined in the alternative or conjunctive.

What is claimed is:

1. A method for controlling an autonomous lawn mower, the method comprising:

determining whether an operator is present on the mower;

generating a command signal for driving one or more traction motors to move the mower, wherein the command signal is limited to a safety limit based on determining that an operator is present on the mower, and wherein the command signal is not limited based on determining that an operator is not present on the mower;

driving the one or more traction motors and/or one or more blade motors using the command signal;

based on the presence of the operator, adjusting a blade height adjustment mechanism using the command signal; and automatically determining the safety limit based on the presence of the operator on the mower, wherein the safety limit comprises; a maximum safe torque output limit of the one or more traction motors for safely operating the mower with the operator present or, and a maximum safe speed output limit of the one or more traction motors for safely operating the mower with the operator present.

2. The method of claim 1, wherein the command signal is generated in response to operator input received from the operator present on the mower.

3. The method of claim 1, wherein the command signal is generated in response to input received when the mower is operating in an autonomous mode.

4. The method of claim 1, wherein the command signal is generated in response to input from an autonomy system which is autonomously operating the mower.

5. The method of claim 1, wherein determining whether an operator is present on the mower further comprises receiving a signal from a sensor associated with the mower which is activated based on the presence of the operator on the mower.

6. The method of claim 5, wherein the sensor includes at least one of an inductive proximity sensor, a camera, hand control touch sensor, a pressure sensor, or an RFID tag.

7. The method of claim 1, wherein determining whether an operator is present further comprises receiving a signal from a sensor associated with an operator platform of the mower.

8. The method of claim 7, wherein the sensor is activated dependent upon a weight of the operator on the operator platform.

9. The method of claim 1, wherein the safety limit comprises a minimum blade height of the blade height adjustment mechanism for safely operating the mower with the operator present.

10. The method of claim 1, wherein the safety limit comprises a maximum blade speed output limit of the one or more blade motors for safely operating the mower with the operator present.

11. An autonomous lawn mower comprising:

a mower body having a cutting deck with a rotatable cutting blade;

one or more traction motors connected to the mower body to move the mower body; and a controller coupled to the one or more traction motors, wherein the controller is configured to:

determine whether an operator is present on the mower;

generate a command signal for driving the one or more traction motors to move the mower, wherein the command signal is limited to a safety limit based on determining that an operator is present on the mower, and wherein the command signal is not limited based on determining that an operator is not present on the mower;

driving the one or more traction motors and/or one or more blade motors using the command signal;

based on the presence of the operator, adjusting a blade height adjustment mechanism using the command signal; and automatically determining the safety limit based on the presence of the operator on the mower, wherein the safety limit comprises: a maximum safe torque output limit of the one or more traction motors for safely operating the mower with the operator present, and a maximum safe speed output limit of the one or more traction motors for safely operating the mower with the operator present.

12. The mower of claim 11, further comprising a sensor associated with the mower which is activated based on the presence of the operator on the mower, the sensor being coupled to the controller, wherein the controller is configured to determine whether an operator is present on the mower by receiving a signal from the sensor.

13. The mower of claim 12, wherein the sensor includes at least one of an inductive proximity sensor, a camera, a pressure sensor, hand control touch sensor, or an RFID tag.

14. The mower of claim 12, wherein the sensor is associated with an operator platform of the mower.

15. The mower of claim 14, wherein the sensor is activated dependent upon a weight of the operator on the operator platform.

16. The mower of claim 11, wherein the safety limit comprises a minimum blade height of the blade height adjustment mechanism for safely operating the mower with the operator present.

17. The method of claim 11, wherein the safety limit comprises a maximum blade speed output limit of the one or more blade motors for safely operating the mower with the operator present.

* * * * *